United States Patent [19]

Brooks

[11] 4,300,926

[45] Nov. 17, 1981

[54] SEPARATION APPARATUS

[76] Inventor: Derrick W. Brooks, 18 Ridge La., Radcliffe-on-Trent, Nottingham, NG12 1BD, England

[21] Appl. No.: 135,790

[22] Filed: Mar. 31, 1980

Related U.S. Application Data

[63] Continuation of Ser. No. 4,041, Jan. 17, 1979.

[30] Foreign Application Priority Data

May 5, 1978 [GB] United Kingdom ............... 4564/78

[51] Int. Cl.³ .......................................... B01D 50/00
[52] U.S. Cl. ...................................... 55/319; 55/418; 209/250
[58] Field of Search ............... 209/250; 302/59, 62; 55/302, 97, 418, 428–433, 319

[56] References Cited

U.S. PATENT DOCUMENTS

| | | | |
|---|---|---|---|
| 122,309 | 1/1872 | Dugan | 209/250 |
| 1,483,228 | 2/1924 | McCullough | 209/250 |
| 3,486,309 | 12/1969 | Wild | 55/302 |
| 3,612,616 | 10/1971 | Stewart | 302/59 |
| 3,887,341 | 6/1975 | Sutter | 55/341 |

Primary Examiner—Norman Yudkoff
Attorney, Agent, or Firm—Bard, Groves, Sroufe, Ryerson & Jackson

[57] ABSTRACT

A duct increasing in cross-sectional area is provided with a screen means on its upper wall. An adjustable baffle is hingedly fixed to the lower wall of the duct at the inlet. Air-borne material carried in an air stream introduced at the inlet is separated from the stream by projection against the screen. The adjustable baffle directs the air-borne material onto the screen.

3 Claims, 1 Drawing Figure

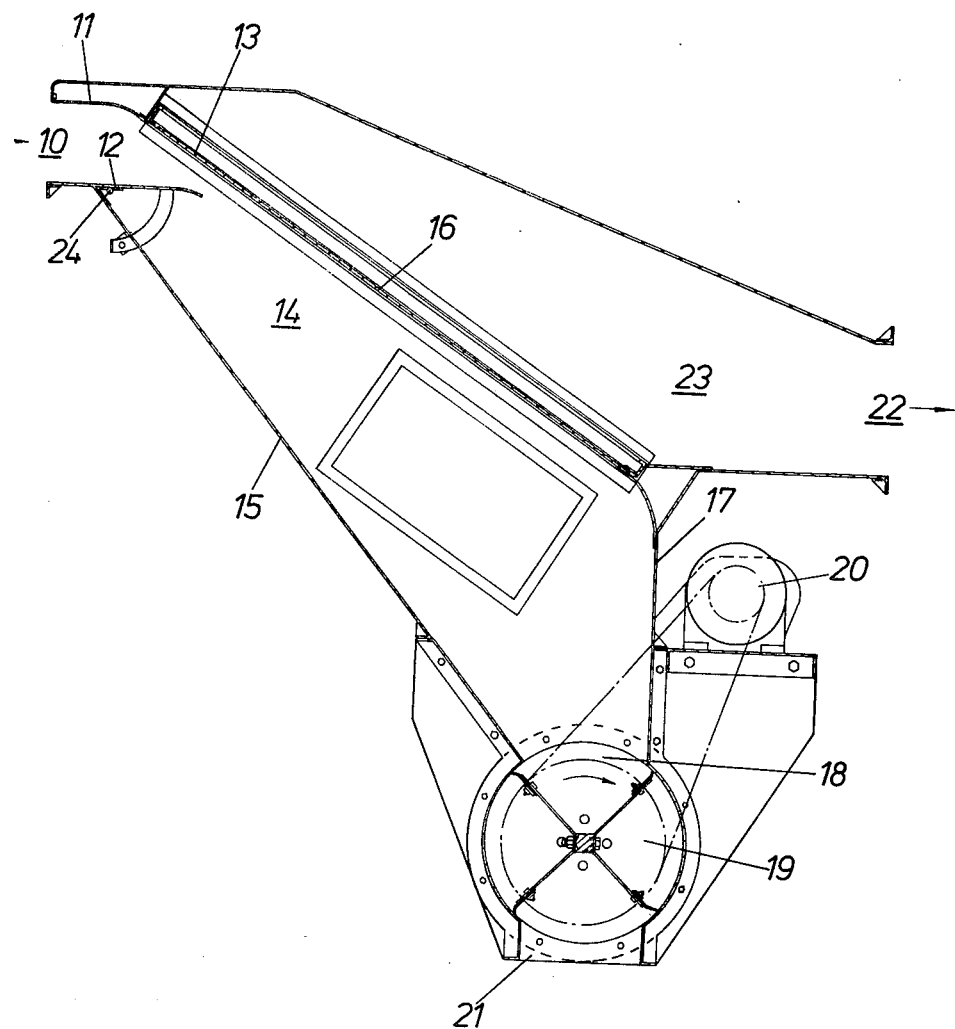

SEPARATION APPARATUS

This is a continuation of application Ser. No. 004,041, filed Jan. 17, 1979.

This invention relates to separation apparatus and to a method of separating air-borne matter.

Conventionally, air-borne matter such as matter conveyed by a low pressure pneumatic conveyor is separated by a mechanical device, such as a cyclone. Such devices, however, are generally large and expensive items of equipment.

According to one aspect of the present invention, we provide apparatus for separating air-borne material comprising an inlet, a duct which increases in cross-sectional area away from said inlet, one wall of said duct comprising a screen, and an outlet comprising an air-lock means.

Preferably, the screen and the opposite wall of the apparatus form two sides of a rectangular cross-section opening.

It is desirable that the angle between said wall and said screen is in the range 10 to 20 degrees, preferably 15 degrees.

In a preferred construction, the screen terminates in an end wall, said wall being at an angle of 115 degrees to 135° to the screen, desirably 125° to the screen.

The inlet is preferably arranged at an angle of 25 to 45 degrees, desirably 35 degrees to the plane of the screen and in the region opposite said inlet a deflector plate may be included.

A preferred form of separation apparatus according to the invention is hereinafter described with reference to the accompanying drawing which is a cross-section of the separation apparatus.

The apparatus which is constructed of sheet metal comprises an inlet 10 for air-borne material defined by a pair of baffles 11 and 12. Opposite said inlet there is provided a deflector plate 13 to deflect the air-borne material into the separating zone 14.

The zone 14 is rectangular in cross section and increases in cross sectional area away from inlet 10. It is defined by a lower wall 15 and on the opposite side a perforated metal screen 16.

The screen 16 terminates in an end wall 17 which, together with the wall 15, defines an inlet 18 to a rotary air-lock device 19. The rotary air-lock 19 is arranged to rotate in a clockwise direction and to be driven by the motor 20. An outlet 21 for separated product is provided at the lower end of said rotary air-lock 19 and outlet 22 for air is provided by the duct 23 which extends on the opposite side of the screen 16.

The device functions as follows; air carrying air-borne matter, for example, from a low pressure pneumatic conveyor, enters the inlet 10 and is deflected by the baffles and deflector plate so as to enter the separation zone 14. As shown the baffle 12 is adjustable about pivot 24 to provide the desired air flow.

As the air is decelerated in the zone 14 air tends to pass through the screen 16 towards the outlet 22 and separated product tends to fall towards the rotary air-lock 19 whereby it is discharged via the outlet 21.

Incoming air, together with air-borne material, enters the device at an angle with respect to the screen 16. As the material passes into the separating zone, the air velocity is reduced as incoming air expands in the increasing cross-sectional area away from the inlet 10 and passes through the screen 16. This causes a tangential air flow in the separating zone relative to the material with the result that the air velocity in the separation zone is no longer sufficient to carry the material which consequently falls into the rotary air-lock.

The angle of inclination of the screen 16 is such that the incoming air tends to form a boundary layer parallel to the screen 16 having the effect of largely stopping any material touching it. It is self cleaning and because material is not in contact with the screen frictional losses are minimal.

By driving the rotary air-lock 19 in the same direction as the product flow a smooth deceleration is obtained which tends to result in low degradation of the separated product.

The separation apparatus as described above is found to be extremely convenient for separating low density materials from a stream of air, particularly irregularly shaped low density materials. Such materials may be fibrous vegetable materials such as paper, tobacco or tea.

According to another aspect of the present invention, therefore, a method of separating air-borne material particularly irregularly shaped low density material, comprises introducing the air-borne material into an inlet of an apparatus as described above and discharging the separated product from the outlet thereof.

We have found that the method and apparatus of the present invention are advantageous in use particularly for irregularly shaped low density materials such as tobbacco, paper and tea. In particular they are much more compact and much cheaper than an equivalent capacity cyclone and also tend to be much more efficient in that no physical work is carried out on the product to be separated and the rates of acceleration and deceleration of air are much less. Furthermore because of the fact that no physical work is carried out on the product there is a reduced tendency for degradation of the separated product.

Furthermore, capacity is simply increased by varying the width of the unit whereas in an equivalent cyclone this is achieved by means of increasing diameter and height.

I claim:

1. Apparatus for continuously separating air-borne material, comprising:
   an inlet for air-borne material;
   an outlet for separated product;
   a duct connecting said inlet to said outlet and increasing in a cross-sectional area away from said inlet, the axis of the duct being angular with respect to the inlet;
   screen means arranged to form at least one upper wall of said duct for removing air from within said duct;
   a lower wall of said duct opposite said screen joining the inlet and defining a first angle with said screen to form said increasing cross-sectional area for decelerating incoming air-borne material to separate material from incoming air;
   the inlet having an inlet axis intersecting said screen at a second angle;
   an adjustable baffle hingedly fixed to the said lower wall and forming a portion of said inlet for directing air-borne material onto said screen at an angle effective to form an air flow boundary layer adjacent said screen which precludes said air-borne material from contacting said screen while permitting air removal through said screen.

2. Apparatus according to claim 1, further including:

an end wall of said duct intersecting said screen at a third angle of 115°–135° to the plane of said screen, and said first angle is 10°–20° and said second angle is 25°–45°.

3. Apparatus according to claim 2, further including: an air-lock means arranged at said outlet.

* * * * *